United States Patent [19]
Martinez et al.

[11] Patent Number: 5,349,846
[45] Date of Patent: Sep. 27, 1994

[54] PORTABLE LEAK/FLOW TEST EQUIPMENT FOR NIGHT VISION EQUIPMENT

[75] Inventors: Erasmo Martinez, Torrance; Steven E. Walmsley, Signal Hill, both of Calif.

[73] Assignee: Hughes Aircraft Company, Los Angeles, Calif.

[21] Appl. No.: 8,380

[22] Filed: Jan. 25, 1993

[51] Int. Cl.$^5$ .............................................. G01M 3/26
[52] U.S. Cl. ........................................................ 73/40
[58] Field of Search ................... 73/40, 49.2

[56] References Cited

U.S. PATENT DOCUMENTS

| | | | |
|---|---|---|---|
| 2,771,769 | 11/1956 | Nielsen | 73/40 |
| 3,186,214 | 6/1965 | Roberts | 73/40 X |
| 3,872,712 | 3/1975 | Westervelt et al. | 73/40 |
| 3,918,291 | 11/1975 | Pauly et al. | 73/40 |
| 4,523,452 | 6/1985 | Brayman | 73/40 |
| 4,794,784 | 1/1989 | Bley | 73/40 X |

*Primary Examiner*—Hezron E. Williams
*Assistant Examiner*—Joseph W. Roskos
*Attorney, Agent, or Firm*—Michael W. Sales; Wanda K. Desnon-Low

[57] ABSTRACT

A portable leak detection system. The inventive system (10) includes a portable housing (40). The housing is equipped with a pneumatic circuit including an inlet (12) for receiving fluid from a source and an outlet (36) for communicating the fluid to an external unit under test. A flow meter (30) is disposed within the housing (40) between the inlet (12) and the outlet (36) for measuring the flow of the fluid into the unit under test. A calibration verification mechanism (50) is disposed within the housing (40) for verifying the calibration of the flow meter (30). In a specific implementation, the invention further includes a pressure regulator (22) disposed within the housing (40) between the inlet mechanism (12) and the flow meter (30). In the specific implementation, a first gauge (16) is disposed between the inlet (12) and the pressure regulator (22) for measuring the pressure of the fluid contained in the source and the calibration verification mechanism (50) is an orifice of predetermined diameter in an instrument panel of the housing (40).

2 Claims, 3 Drawing Sheets

PORTABLE LEAK/FLOW TEST EQUIPMENT FOR NIGHT VISION EQUIPMENT

BACKGROUND OF THE INVENTION

1. Field of the Invention

The present invention relates to night vision equipment. More specifically, the present invention relates to systems for maintaining pressurized enclosures for night vision equipment.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

2. Description of the Related Art

The utility of night vision systems for military and commercial applications is currently well recognized. Many night vision system optical and electronic components must be kept in a moisture-free environment for optimum performance. These systems generally employ a gas such as nitrogen under pressure within an enclosure to achieve low humidity. However, nitrogen has a tendency to leak because of the molecular structure thereof and because of the mechanical limitations of seals.

Conventional systems for detecting leaks in enclosures for night vision systems are embodied in large, heavy, bulky, nonmovable consoles. The consoles provide a work bench and gauges and other instruments for detecting leaks and performing other operations.

Unfortunately, the size of the console is typically such that field maintenance is impractical. Thus, each night vision system to be serviced must be removed from service and brought to a location having such a console. In addition, the conventional leak detection system has no self-check process control capability. These systems have a tendency to lose accuracy over time. Calibration of a leak detection system is time consuming and difficult to perform as extensive console breakdown is typically required to calibrate internal instruments.

While somewhat portable leak detectors are commercially available, those that detect leak rates in the range for night vision systems are generally quite expensive.

Hence, there is a need in the art for a portable inexpensive system for detecting leaks in night vision enclosure systems.

SUMMARY OF THE INVENTION

The need in the art is addressed by the present invention which provides a portable leak detection system. The inventive system is embodied in a portable housing and has a pneumatic circuit including an inlet for receiving fluid from a source and an outlet for communicating the fluid to an external unit under test. A flow meter is disposed within the housing between the inlet and the outlet for measuring the flow of the fluid into the unit under test. A calibration mechanism is provided within the housing for verifying the calibration of the flow meter.

In a specific implementation, the invention further includes a pressure regulator disposed within the housing between the inlet mechanism and the flow meter. In the specific implementation, a first gauge is disposed between the inlet and the pressure regulator for measuring the pressure of the fluid contained in the source and the calibration mechanism is an orifice of predetermined diameter in an instrument panel of the housing.

DESCRIPTION OF THE INVENTION

Illustrative embodiments and exemplary applications will now be described with reference to the accompanying drawings to disclose the advantageous teachings of the present invention.

Figure 1:
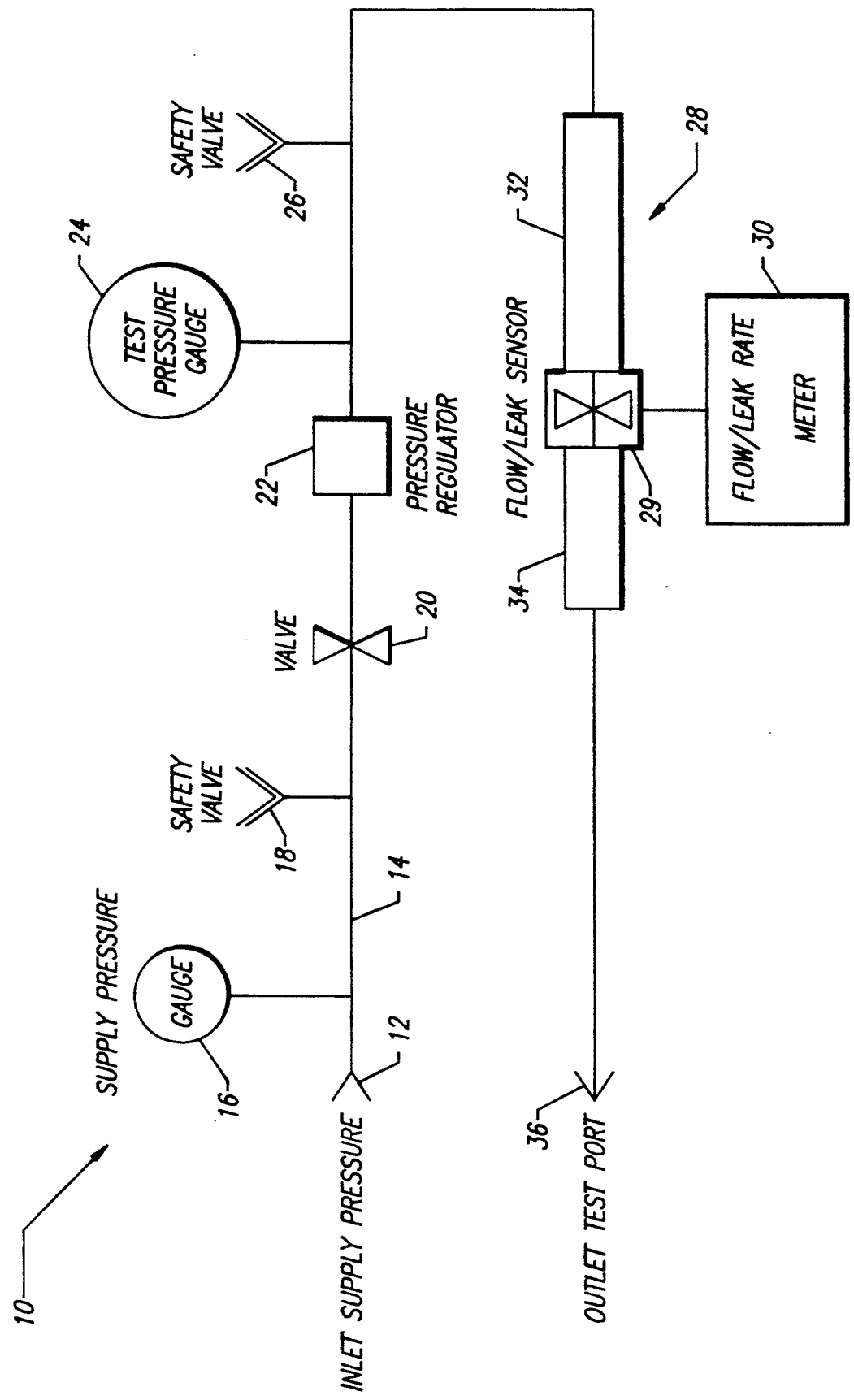
FIG. 1 is a pneumatic schematic of an illustrative implementation of the portable leak detection system of the present invention.

FIG. 1 is a pneumatic schematic of an illustrative implementation of the portable leak detection system of the present invention. The system 10 includes a first conventional fitting 12 adapted for connection to a bottle of supply fluid (not shown). The bottle may provide nitrogen or other gaseous fluid under say 100 pounds of pressure. The fitting 12 may be copper, brass, stainless steel or other suitable material. In the illustrative embodiment, the fitting 12 is connected to a ¼ inch copper line 14. A supply pressure gauge 16 is connected to the line 14. In the illustrative embodiment, the pressure gauge 16 is a conventional 2 inch diameter gauge accurate within the desired range (e.g., 0-200 psig). The pressure gauge 16 may be purchased from U. S. Gauge and other such companies. For safety, a conventional safety valve 18 is connected to the line 14 between the inlet 12 and a two-way on-off valve 20. The safety valve 18 is designed to open at a selected pressure (e.g., 125-135 psig) to protect the gauge 16. The two-way valve 20 is a conventional ¼ inch in-line on-off valve of the needle, gate or ball valve variety by way of example. The valve 20 serves to protect a pressure regulator 22 connected thereto.

The pressure regulator 22 should be a self-venting regulator. In the illustrative embodiment, the pressure regulator 22 is a conventional ¼ inch pressure regulator. The pressure regulator 22 may be purchased from Fairchild and other similar manufacturers. A test pressure gauge 24 is connected to monitor the outlet pressure of regulator 22. The gauge 24 is a conventional gauge suitable for a given application. In the illustrative embodiment, the test pressure gauge 24 has a face six inches in diameter with a range of 0-3.5 psi. The regulator 22 is set to the specified test pressure, 0.4 psig for example. A second conventional safety valve 26 is attached to the line between the regulator 22 and the flow/leak meter 28. In the illustrative embodiment, the safety valve 26 is set at 0.5 psig for example to provide protection for the unit under test (not shown).

In the preferred embodiment, the flow/leak meter 28 is a small, lightweight flow meter such as that manufactured by Flow Technology of Tucson, Ariz. The meter 28 includes a flow sensor 29 and a meter 30. The sensor 29 is a small turbine which senses a flow of fluid and provides a signal to the meter 30. The sensor 29 is disposed between laminar flow stainless steel straighteners 32 and 34 as is common in the art. The meter 30 may be equipped with preamplifiers to ensure a linear operation thereof. The flow/leak meter 28 is connected to a unit under test (e.g. the housing of a night vision system) via a test port and a hose (not shown).

Figure 2:
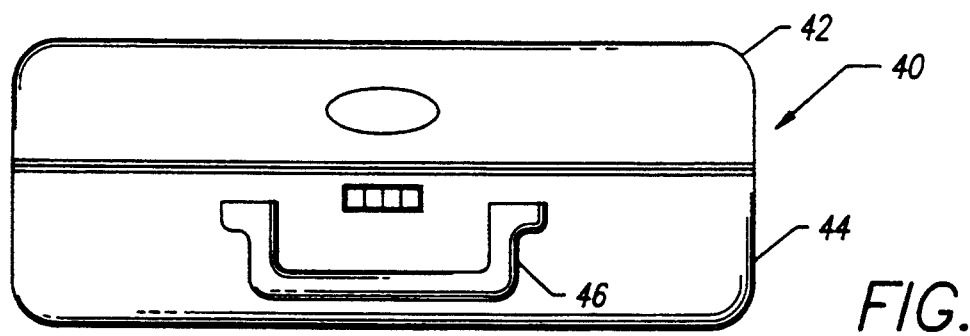
FIG. 2 is a front view of an illustrative implementation of the portable leak detection system of the present invention in a closed position.

FIG. 2 is a front view of an illustrative implementation of the portable leak detection system of the present invention in a closed position. The system is contained within a housing 40 constructed of aluminum or other suitable material. The housing includes an upper portion 42 and a lower portion 44 within which the pneumatic circuit, described above, is disposed. In the illustrative embodiment, the unit is small, having dimensions of 16.5 by 21 by 7.5 inches, and portable, having a weight of 27 pounds.

Figure 3:
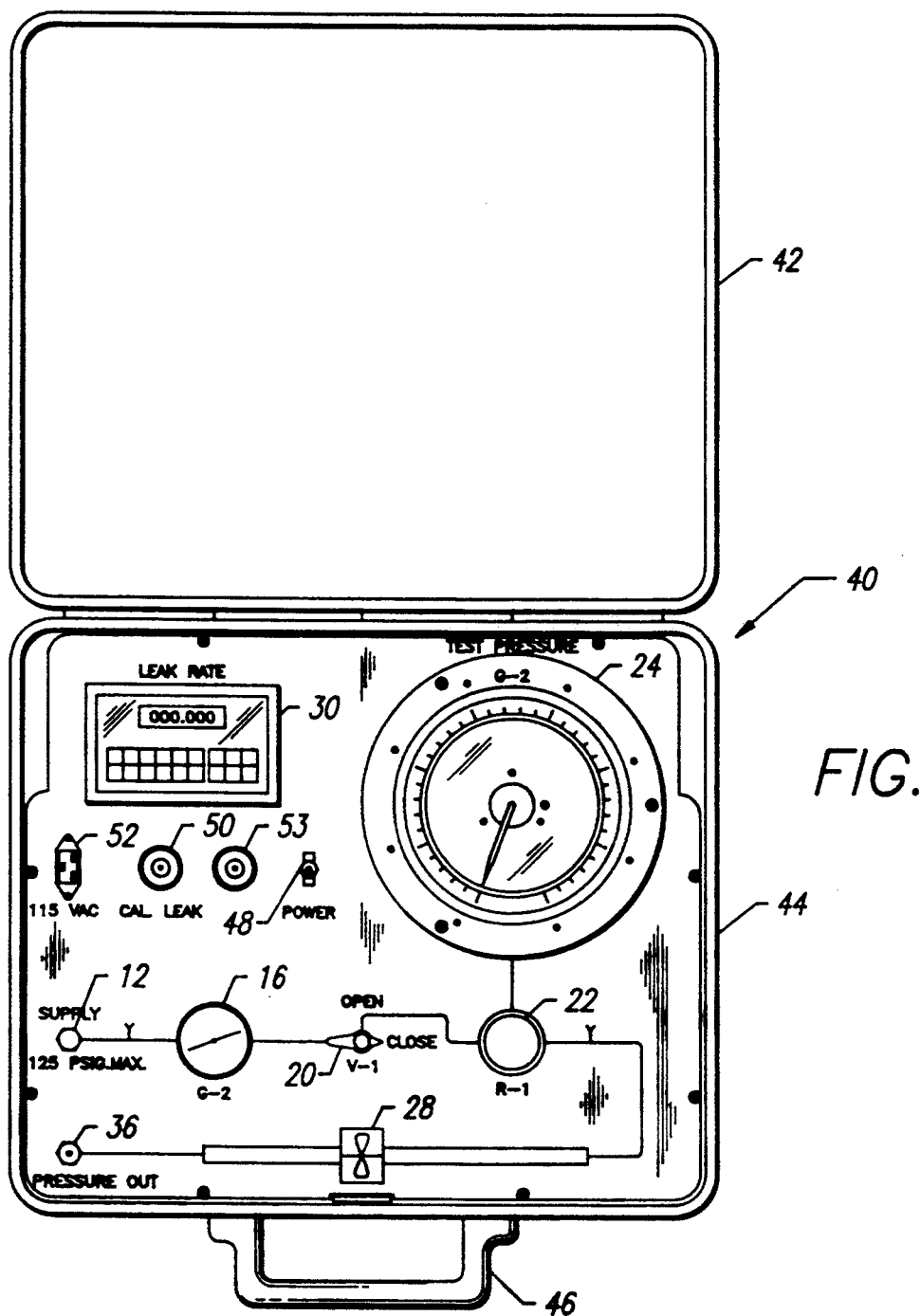
FIG. 3 is a top view of the instrument panel of the illustrative implementation of the portable leak detection system of the present invention in an open position.

FIG. 3 is a top view of the instrument panel of the illustrative implementation of the portable leak detection system of the present invention in an open position. FIG. 3 reveals a power switch 48 and a power connector 52 for the meter 30. A calibration orifice 50 is disposed between the power switch 48 and the connector 52. The calibration orifice is connected to a fitting (not shown) which is adapted to be connected to the test port 36 via a hose (not shown). The orifice 50 has a diameter designed to simulate a leak of a predetermined flow rate. One skilled in the art will be able to calculate the diameter of the orifice for a suitable leak rate using conventional teachings.

Figure 4:
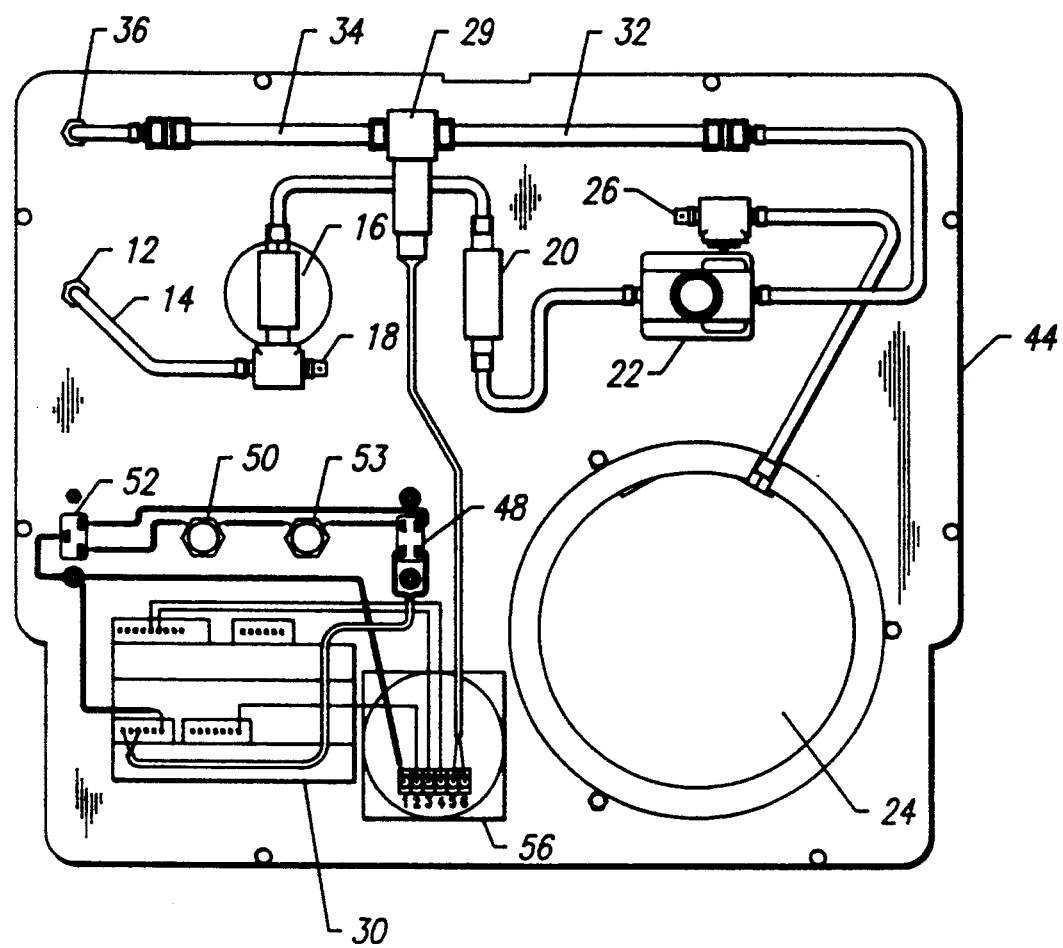
FIG. 4 is a rear view of the instrument panel of the illustrative implementation of the portable leak detection system of the present invention.

FIG. 4 is a rear view of the instrument panel of the illustrative implementation of the portable leak detection system of the present invention. The rear view of FIG. 4 reveals a signal conditioner 56 which typically includes a preamplifier and ensures linearity of the flow meter 28. The signal conditioner 56 is typically sold by the manufacturer of the flow meter.

In operation, the valve 20 is closed, the pressure regulator 22 is closed, the hose (not shown) is connected to the calibration fitting and supply pressure is connected to the inlet fitting 12. When the pressure of the supply is determined to be within a safe range, the valve 20 is opened, then the regulator is opened. The regulator brings the supply pressure down to a range suitable for the unit under test (not shown). Fluid flows through the meter to the unit under test. When the unit stabilizes at the pressure set by the regulator (e.g., 0.42 psig), flow should stop. If flow continues, a leak is detected and indicated by the flow meter 28.

Thus, the present invention has been described herein with reference to a particular embodiment for a particular application. Those having ordinary skill in the art and access to the present teachings will recognize additional modifications, applications and embodiments within the scope thereof.

It is therefore intended by the appended claims to cover any and all such applications, modifications and embodiments within the scope of the present invention.

Accordingly,

What is claimed is:

1. A portable leak detection system comprising:
   a portable housing;
   inlet means disposed within said housing for receiving fluid from a source;
   outlet means disposed within said housing for communicating said fluid supplied via said inlet means to an external unit under test;
   flow meter means disposed within said housing and connected between said inlet means and said outlet means for measuring the flow of the fluid into said unit under test;
   means disposed within said housing for verifying calibration of said flow meter means;
   a pressure regulator disposed within said housing and connected between said inlet means and said flow meter means;.
   a first gauge disposed within said housing between said inlet and said pressure regulator for measuring the pressure of the fluid contained in said source; and;
   a first two-way valve disposed within said housing between said first gauge and said pressure regulator.

2. The invention of claim 1 wherein said calibration verification means is an orifice of predetermined diameter in an instrument panel of said housing.

* * * * *